US009990511B1

(12) United States Patent
Dreyfus (10) Patent No.: US 9,990,511 B1
(45) Date of Patent: *Jun. 5, 2018

(54) USING ENCRYPTED BACKUP TO PROTECT FILES FROM ENCRYPTION ATTACKS

(71) Applicant: Symantec Corporation, Mountain View, CA (US)

(72) Inventor: Jonathan Dreyfus, Pleasanton, CA (US)

(73) Assignee: Symantec Corporation, Mountain View, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 14/947,781

(22) Filed: Nov. 20, 2015

(51) Int. Cl.
*G06F 21/62* (2013.01)
*G06F 3/06* (2006.01)

(52) U.S. Cl.
CPC .......... *G06F 21/6218* (2013.01); *G06F 3/065* (2013.01); *G06F 3/067* (2013.01); *G06F 3/0619* (2013.01)

(58) Field of Classification Search
CPC .... G06F 21/6218; G06F 3/0619; G06F 3/065; G06F 3/067; G06F 21/602; G06F 2221/2107; G06F 21/6209; H04L 63/0428
See application file for complete search history.

(56) References Cited

U.S. PATENT DOCUMENTS

| | | | | | |
|---|---|---|---|---|---|
| 7,421,136 | B2 * | 9/2008 | Sirohey | ................. | G06T 3/4092 375/E7.013 |
| 7,472,420 | B1 * | 12/2008 | Pavlyushchik | ......... | G06F 21/55 707/999.2 |
| 8,522,346 | B1 * | 8/2013 | Harris | ................. | G06F 21/6218 726/23 |
| 8,590,041 | B2 * | 11/2013 | Brinkley | ............... | G06F 21/566 726/22 |
| 9,317,686 | B1 * | 4/2016 | Ye | ........................ | G06F 11/1461 |
| 2002/0174349 | A1 * | 11/2002 | Wolff | ..................... | G06F 21/565 713/188 |
| 2006/0045309 | A1 * | 3/2006 | Suthaharan | ........... | G06T 1/0042 382/100 |
| 2009/0172410 | A1 * | 7/2009 | Maor | .................. | G06F 21/6218 713/189 |
| 2011/0216936 | A1 * | 9/2011 | Reed | ........................ | G06K 9/00 382/100 |
| 2016/0162886 | A1 * | 6/2016 | Howe | .................. | G06Q 20/382 705/44 |
| 2016/0378988 | A1 * | 12/2016 | Bhashkar | ............... | G06F 21/566 726/24 |
| 2017/0034189 | A1 * | 2/2017 | Powell | ................ | H04L 63/1416 |

* cited by examiner

*Primary Examiner* — Yonas Bayou
(74) *Attorney, Agent, or Firm* — Patterson + Sheridan, LLP (57) ABSTRACT

The present disclosure relates to protecting files from attacks by malicious encryption programs. According to one embodiment, an endpoint system detects access to a file by an application and creates a copy of the file in temporary storage. The endpoint system determines whether the application has encrypted the file, and upon determining that the application has encrypted the file, the endpoint system creates an encrypted backup copy of the file using the copy in temporary storage and a trusted key and stores the encrypted backup copy in a secure storage location.

17 Claims, 5 Drawing Sheets

USING ENCRYPTED BACKUP TO PROTECT FILES FROM ENCRYPTION ATTACKS

BACKGROUND

Field

Embodiments presented herein generally relate to data loss prevention systems, and more specifically, to using encrypted backups to prevent data loss from encryption attacks.

Description of the Related Art

Computer security systems protect systems from threats arising from malware, such as viruses, worms, Trojan horses, and so on. Some of these threats, known as ransomware, take over an endpoint system (e.g., a personal computer) until a user pays a ransom fee. In some cases, ransomware may simply lock a user out from an endpoint system until the user pays the ransom fee for an unlock code. More destructive ransomware, like cryptolocker attacks, encrypt files using a large encryption key (e.g., 2048 bits). Because finding the appropriate decryption key using a brute force attack is largely impossible, users either pay the ransom fee to obtain the decryption key or lose data that had not been backed up before a cryptolocker attack executed on the endpoint system.

To protect against ransomware like cryptolocker attacks, some endpoint systems may include security software that detects that executable code contains a cryptolocker payload and prevents such code from executing on the endpoint system. As the threat environment changes and new variations of cryptolocker-like malware arise, endpoint systems may be unable to prevent attacks from new variations until updated threat signatures are obtained.

Generally, encryption operations performed by malware are indistinguishable from encryption operations performed by legitimate programs. Blocking encryption programs generally or duplicating files before encryption may prevent cryptolocker attacks from successfully compromising files on an endpoint system, such a policy may result in legitimate encryption operations failing or unencrypted copies of encrypted files remaining on an endpoint system after a legitimate encryption program accesses the files.

SUMMARY

One embodiment of the present disclosure includes a method for preventing data loss at an endpoint system. The method generally includes detecting access to a file by an application and subsequently creating a copy of the file in temporary storage. The endpoint system determines whether the application has encrypted the file. Upon determining that the application has encrypted the file, the endpoint system creates an encrypted backup copy of the file using the copy in temporary storage and the trusted key and stores the encrypted backup copy in a secure storage location.

Another embodiment provides a computer-readable storage medium having instructions, which, when executed on a processor, performs an operation for preventing data loss at an endpoint system. The operation generally includes detecting access to a file by an application and subsequently creating a copy of the file in temporary storage. The endpoint system determines whether the application has encrypted the file. Upon determining that the application has encrypted the file, the endpoint system creates an encrypted backup copy of the file using the copy in temporary storage and the trusted key and stores the encrypted backup copy in a secure storage location.

Still another embodiment of the present invention includes a processor and a memory storing a program, which, when executed on the processor, performs an operation for preventing data loss at an endpoint system. The operation generally includes detecting access to a file by an application and subsequently creating a copy of the file in temporary storage. The endpoint system determines whether the application has encrypted the file. Upon determining that the application has encrypted the file, the endpoint system creates an encrypted backup copy of the file using the copy in temporary storage and the trusted key and stores the encrypted backup copy in a secure storage location.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments presented herein provide techniques for using a trusted encryption key to generate an encrypted copy of files accessed by an encryption application executing on an endpoint system. A trusted encryption key can be generated for the endpoint system, and the corresponding trusted decryption key can be securely stored on a remote system. For example, an endpoint system can create an encrypted backup using a trusted encryption key when an application with an unknown trust status accesses and encrypts files on an endpoint system. If the endpoint security system determines that the application is malicious (e.g., a variant of ransomware), the endpoint system can retrieve the trusted decryption key from the remote system, decrypt the backup generated by the endpoint system, and replace files encrypted by the malicious application with files from the decrypted backup. Encrypted backup copies of files may be automatically removed if a user does not restore files from the encrypted backup within a set amount of time after the endpoint system creates the encrypted backup.

Figure 1:
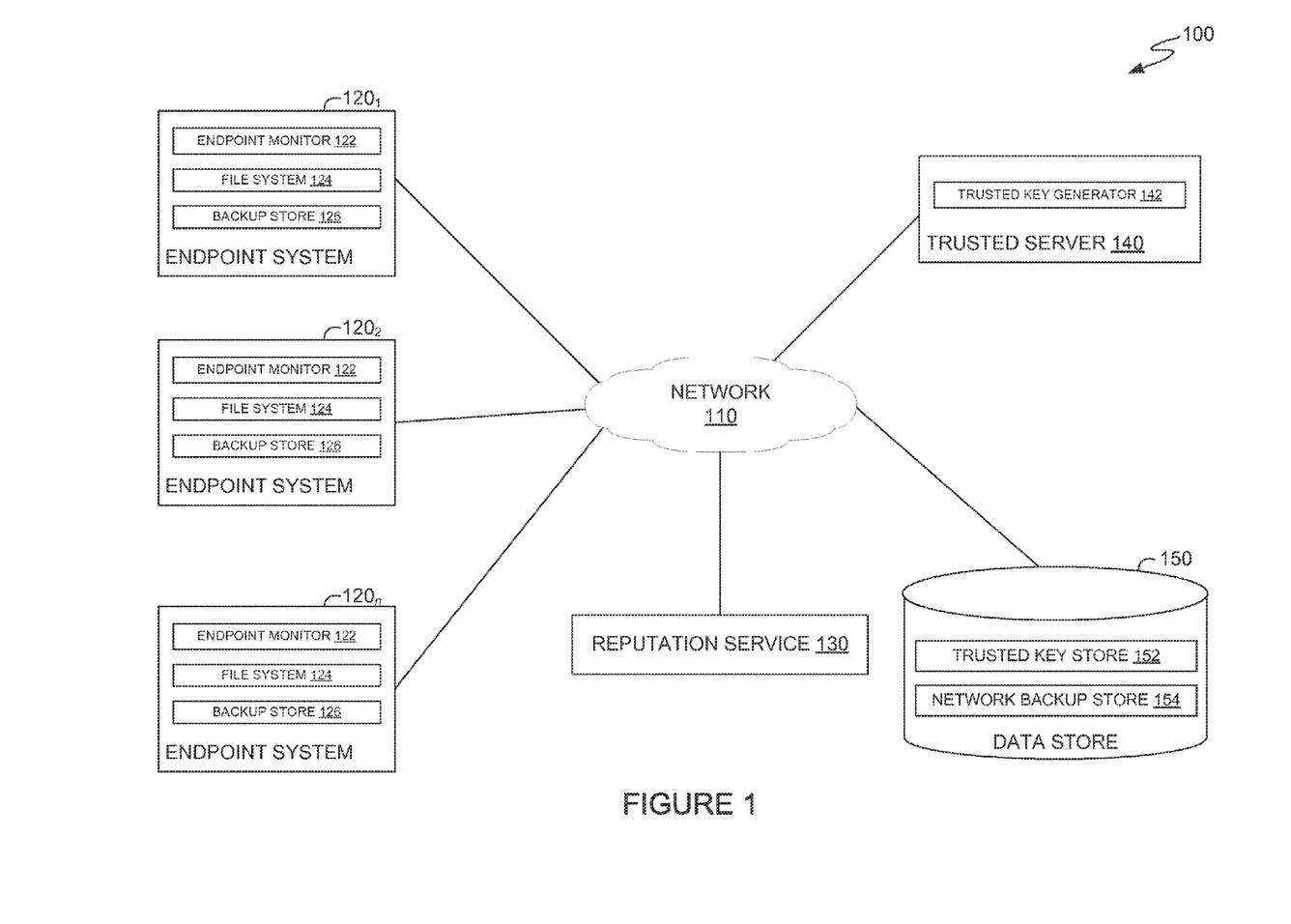
FIG. 1 illustrates an example of a networked computing environment, according to one embodiment.

Advantageously, by creating an encrypted backup copy of files accessed by a possible encryption application, an endpoint system can generate a copy of files that can be used to restore files encrypted by malicious applications. Additionally, creating an encrypted backup copy ensures that unencrypted copies of files encrypted by a legitimate application are not left on an endpoint system FIG. 1 illustrates an example computing environment 100, according to one embodiment. As shown, the computing environment a plurality of endpoint systems 120, a reputation service 130, a trusted server 140, and a data store 150, connected to a network 110. In some cases, each of the endpoint systems 120 may access reputation service 130, trusted server 140, and data store 150 through network 110 via an external network.

Each endpoint system 120 in network 110 may execute a data loss prevention (DLP) application to monitor and prevent data loss events. As illustrated, endpoint systems 120 generally include an endpoint monitor 122, a file system 124, and a backup store 126. Endpoint monitor 122 is generally configured to monitor endpoint system 120 for file encryption activity by an application and generate encrypted backup copies of files in response to detected file encryption activity.

Endpoint monitor 122 generally includes an interface for monitoring applications executing on endpoint system 120 and an encryption engine for creating a backup copy of files on the endpoint system. In some cases, endpoint monitor 122 may also include an interface for querying a reputation service for information about an application.

In some cases, when endpoint monitor 122 is installed on endpoint system 120, endpoint monitor 122 may interface with a trusted server 140 to generate a key pair, i.e., a trusted encryption key and corresponding trusted decryption key. The key pair could also be generated when a user initially registers endpoint monitor 122 with trusted server 140. In some cases, a public-private key scheme may be implemented, with the public key used as the trusted encryption key and the private key used as the trusted decryption key. After trusted server 140 generates the key pair, endpoint monitor 122 can obtain and store the trusted encryption key on endpoint system 120 or in a trusted key store 152 in data store 150.

Endpoint monitor 122 may launch when endpoint system 120 is booted up. When applications begin executing on endpoint monitor 122, endpoint monitor 122 can monitor file system 124 for a pattern of file accesses and activity by applications executing on endpoint system 120. As applications access files on file system 124, endpoint system 120 can create a copy of the accessed files in system memory. In some cases, endpoint system 120 can determine whether to generate copies of accessed files based on the reputation of the application accessing a file. For example, endpoint system 120 need not generate a copy of the accessed files for applications that are trusted (e.g., commercially available software that is signed by the software provider or widely used and trusted open-source applications), but may generate a copy of the accessed files for applications that are neither trusted nor untrusted (e.g., have an unknown reputation).

Endpoint monitor 122 may also monitor accessed files for changes that indicate an application encrypting the accessed files. For example, because user data is generally not highly randomized, endpoint monitor 122 may calculate the entropy of the copy of the file in system memory and the file stored on file system 124. If the entropy of the file stored on file system 124 indicates that the contents of the file appear to be highly random (e.g., above a threshold) and the entropy of the copy in system memory is much lower, endpoint monitor 122 may begin to generate a backup copy of the files accessed by the application.

In some cases, endpoint monitor 122 may monitor files accessed by an application for changes by detecting markers in an accessed file that indicate a malicious process (e.g., ransomware) has modified the file. For example, endpoint monitor 122 can scan files for strings or bit patterns (e.g., in a particular location of a file, such as a file header) that are known to be generated by malicious processes. Upon detecting a string or bit pattern in a file matching strings or bit patterns indicative of malicious activity, endpoint monitor 122 may generate a backup copy of the files accessed by the application.

In some cases, endpoint monitor 122 may determine that files have been encrypted by detecting a change in a file name. For example, endpoint monitor 122 may begin to generate a backup copy of the files accessed by the application if the application changed the file extension. In one case, endpoint monitor 122 may generate a backup copy of a file if the file extension of an accessed file has changed from a known extension (e.g., .doc for a Microsoft Word document, .pdf for an Adobe PDF document, etc.) to a different, unknown extension (e.g., ".encrypted," or a random string).

That is, in response to detecting that an application is encrypting a file on endpoint system 120, the endpoint monitor 122 may generate an encrypted backup copy of that file. To do so, the endpoint monitor 122 obtains the trusted encryption key generated by trusted server 140 and encrypts a backup copy of the file accessed by the application. The resulting backup copy may be stored in backup store 126 on endpoint system 120 or in network backup store 154 on data store 150. In some cases, the resulting backup copy may be stored in backup store 126 on endpoint system 120 or in network backup store 154 on data store 150.

In some embodiments, endpoint monitor 122 may query a reputation service 130 and/or a locally-configured whitelist to determine if endpoint monitor 122 is to generate an encrypted backup copy of files accessed by an application. For example, endpoint monitor 122 may allow known and trusted applications including an encryption component to access files on endpoint system 120 without generating an additional encrypted backup using the trusted encryption key. On the other hand, endpoint monitor 122 may begin encrypting, using the trusted encryption key, files accessed by applications with an unknown reputation (e.g., neither trusted nor untrusted). In some embodiments, endpoint monitor 122 may first examine a local reputation repository (e.g., an application whitelist and/or blacklist) to determine whether or not to initiate encrypted backup operations using the trusted encryption key. For example, in an enterprise network where a custom application includes an encryption component, such an application may be trusted within the enterprise network (i.e., included on a whitelist in the local reputation repository) but unknown to reputation service 130. By examining a local application whitelist, endpoint monitor 122 may avoid generating encrypted backup copies of files for applications deemed to be legitimate within the enterprise environment.

In some cases, endpoint monitor 122 may determine that an application is malicious after the application has encrypted some files stored on endpoint system 120. When endpoint monitor 122 determines that an encryption application is malicious, endpoint monitor 122 can terminate the application and inform the user that the encrypted files can be restored from a backup copy encrypted using a trusted encryption key. In other cases, a user can manually request that endpoint monitor 122 restore files from an encrypted backup copy upon determining that files that were previously usable are now encrypted or corrupted.

To restore files from an encrypted backup, endpoint monitor 122 can obtain the trusted decryption store from a remote source (e.g., trusted server 140 or trusted key store 152 on data store 150). Using the trusted decryption key, endpoint monitor 122 may obtain unencrypted copies of the files modified by a malware application (e.g., a cryptolocker variant or other ransomware) and replace the affected files with copies from the backup.

In some cases, endpoint monitor 122 may generate an encrypted backup with an associated deletion timer. If a user does not access the backup before the timer expires, file system 124, backup store 126, or network backup store 154 (depending on where the encrypted backup is stored) can delete the backup. The deletion timer may be set to an amount of time that would elapse before a user detected that a malicious encryption application executed on endpoint system 120 and encrypted at least some of the files stored on endpoint system 120. In some cases, the deletion timer may be set to a shorter amount of time if backups are stored in network backup store 154 on data store 150 than if backups are stored in file system 124 or backup store 126 on endpoint system 120.

In some cases, file system 124, backup store 126, or network backup store 154 can delete encrypted backup copies based on storage quotas associated with the backup store. For example, as endpoint monitor 122 saves encrypted backup copies of files to a backup repository with an amount saved content at or near the storage quota, file system 124, backup store 126, or network backup store 154 may remove older backup files to create space for newly generated backup copies. The backup store may remove backup copies, for example, on a per-file basis, as discussed above, or on a per-backup-event basis (e.g., deleting all backup files generated in response to detecting file modification by a specific application at a specific point in time).

In some cases, endpoint monitor 122 can delete encrypted backup copies upon determining that the application that triggered endpoint monitor 122 to generate an encrypted backup is a legitimate application. For example, if a user adds the application to a local whitelist, endpoint monitor 122 can scan file system 124, backup store 126, or network backup store 154 for encrypted backups generated in response to detecting that the application has encrypted files on file system 124 and delete the encrypted backups from the appropriate backup storage location. In some cases, endpoint monitor 122 may additionally scan for encrypted backups generated in response to applications added to a trusted list of applications at reputation service 130 and delete encrypted backups generated in response to detecting that the newly added applications are trusted at reputation service 130.

In some cases, endpoint monitor 122 can generate an alert when endpoint monitor 122 detects that an application is performing encryption operations on files stored on endpoint system 120. If a user indicates that the application is a malicious application, endpoint monitor 122 can terminate the application, restore the affected files from the encrypted backup, and subsequently delete the encrypted backup. If the user indicates that the application is not a malicious application, endpoint monitor 122 can terminate creation of the encrypted backup and delete the encrypted backup.

As discussed above, encrypted backup copies of files stored on file system 124 may be stored, at least temporarily, on file system 124 or in backup store 126 on endpoint system 120. To protect the encrypted backup and prevent malware from encrypting or otherwise corrupting the encrypted backup, endpoint system 122 may take measures to hide the encrypted backup. For example, if the encrypted backup is stored on file system 124, endpoint system 122 may create a protected directory on file system 124 in which endpoint system 122 saves the encrypted backup. The protected directory may allow write access only by endpoint monitor 122 and either allow other applications to only read the protected directory or block all access to the protected directory by applications other than endpoint monitor 122. In some cases, backup store 126 may include free space in a system primary partition used to store system files and the master boot record for endpoint system 120. Alternatively, endpoint monitor 122 may create backup store 126 as another hidden partition on a local storage device attached to endpoint system 120.

Reputation service 130 generally may be an existing service that uses crowdsourced data to determine whether applications and network destinations are trusted, untrusted, or unknown. In some cases, reputation service 130 may be hosted in the cloud and accessible by endpoint monitor 122 via an external network (e.g., the Internet). As new applications and threats are introduced into various computing environments, reputation service 130 may be updated to reflect the reputation of the new applications. For example, when a new version of an office productivity suite is released, reputation service 130 may be updated to reflect that the new version of the office productivity suite is trusted (like previous versions of the suite). Other applications may initially have an unproven or unknown reputation, and as reputation service 130 receives additional data about the application from other users, reputation service 130 may update the reputation to reflect user feedback about the application. In some cases, reputation data about known threats (e.g., applications that are known to be part of an ATP attack, rogue keyloggers, botnet software, etc.) may be stored in reputation service 130 with an untrusted reputation to prevent such applications from executing on endpoint systems.

Trusted server 140 may be, for example, a server controlled by a known and trusted organization to provide trusted encryption and decryption keys for use in creating encrypted backups, as discussed above. Trusted server 140 may be operated within an enterprise network or by a third party, such as a security software provider or a certificate authority. Trusted server 140 generally includes a trusted key generator 142, which generates the trusted encryption and decryption keys which are used, as described above, by endpoint monitor 122 to create encrypted backup copies of files stored on endpoint system 120 and restore files from encrypted backup copies in response to file encryption or corruption by malware.

Data store 150 may be a networked data store used by multiple endpoint systems 120 to store trusted keys and/or encrypted backups generated by endpoint monitor 122 in response to detecting encryption activity on an endpoint system 120. Data store 150 may include a trusted key store 152 and a network backup store 154.

Trusted key store 152 generally stores encryption and decryption keys created by trusted server 140 and used by an endpoint monitor 122 to generate encrypted backup copies of files stored on an endpoint system 120 and restore files from an encrypted backup copy onto endpoint system 120. In some embodiments, trusted key store 152 may be a database and include data associating generated trusted encryption and decryption keys to a particular user or endpoint system 120.

Network backup store 154 generally provides a repository in which encrypted backup copies of files stored on endpoint system 120 are stored. In an embodiment, network backup store 154 includes a plurality of directories into which an endpoint monitor 122 can upload encrypted backups. Each directory may be associated with a user or endpoint machine information stored in trusted key store 152. In some embodiments, network backup store 154 may further include a database to maintain information about each encrypted backup uploaded to network backup store 154. For example, the database can correlate a backup with a particular user and/or endpoint system, a creation date, and an expiration timer. As discussed above, network backup store 154 can use the creation date and expiration timer to determine when an encrypted backup can be deleted from network backup store 154.

Figure 2:
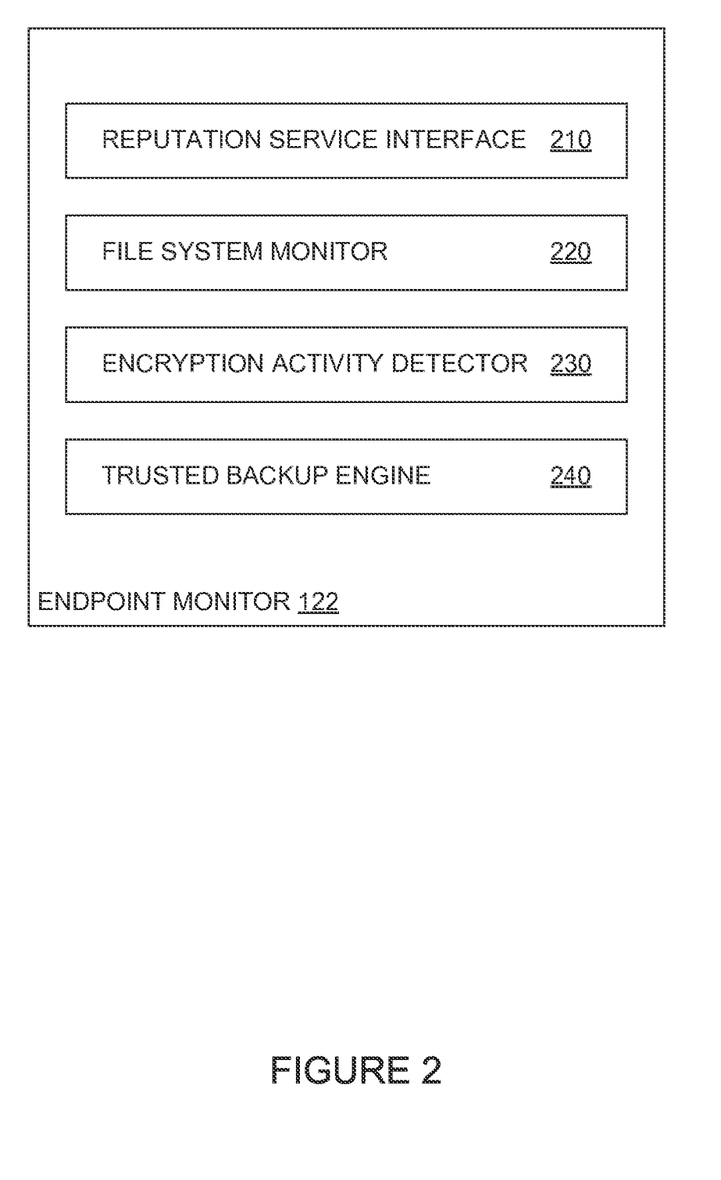
FIG. 2 illustrates an example endpoint security system, according to one embodiment.

FIG. 2 illustrates an example endpoint monitor 122 that uses trusted encryption and decryption keys to generate encrypted backups in response to detecting that an application is encrypting files stored on an endpoint system, according to an embodiment. As illustrated, endpoint monitor 122 includes a reputation service interface 210, file system monitor 220, encryption activity detector 230, and trusted backup engine 240.

Reputation service interface 210 provides endpoint monitor 122 an interface to reputation service 130 and/or local application whitelists. When an application begins executing on endpoint system 120, endpoint monitor 122 can query reputation service 130 and/or local application whitelists for information about the trust status of the application. Reputation data obtained from a reputation service 130 via reputation service interface 210 may be broadly grouped into three categories: trusted, untrusted, and unknown.

As discussed above, endpoint monitor 122 can determine whether to monitor for encryption activity by an application and/or create a backup copy of files in response to detecting encryption application by an application. For example, endpoint monitor 122 can generally allow applications with trusted or "good" reputations returned from reputation service 130 or applications included on a whitelist in a local reputation repository to execute on endpoint system 210 without further file system monitoring or generating an encrypted backup copy of files accessed by the application. For applications with "untrusted" reputations returned from reputation service 130 or applications included on a local blacklist, endpoint monitor 122 may prevent these applications from executing. Finally, for applications with reputations that are neither trusted nor untrusted according to reputation service 130 or applications that are not included in a local reputation repository (e.g., neither on a local whitelist or blacklist), endpoint monitor 122 can initiate file system monitoring and encryption activity detection for the application and can generate encrypted backup copies of files accessed by the application.

File system monitor 220 is generally configured to intercept file operations initiated by an application to track file accesses by applications executing on endpoint system 120. Endpoint monitor 122 may set file system monitor 220, for example, to monitor file operations by applications with unknown reputations (i.e., applications that are neither trusted nor untrusted). For such applications, endpoint monitor 122 may, before allowing an application to access a requested file, create a copy of the file in system memory (e.g., RAM). Once file system monitor 220 creates a copy of the file in system memory, file system monitor 220 allows the application to read and modify the file.

Encryption activity detector 230 generally examines files for evidence of possible encryption after an application completes file operations on a file. In some cases, encryption activity detector 230 can calculate the entropy of the source file based on the copy stored in system memory and the file stored in file system 124 of endpoint system 120. If the entropy of the file stored in file system 124 indicates that a file has become significantly more random than the copy of the file in system memory, encryption activity detector 230 can invoke trusted backup engine to create a backup copy of the file. Otherwise, encryption activity detector 230 can determine that the file has not been encrypted or scrambled, and based on such a determination, determine that no backup need be created for the file.

Trusted backup engine 240 uses a trusted encryption key generated by trusted server 140 to create encrypted backup copies of files that are significantly modified by an application. Trusted encryption engine 240 may be invoked by an encryption activity detector to perform backup operations on files accessed by the application and may discontinue operations when file system monitor 220 detects that the application has terminated. To create a backup, as discussed above, trusted encryption engine 240 may read the trusted encryption key from a secure location in local storage (i.e., on endpoint system 120) or from trusted key store 152 and encrypt the file copies stored in system memory using the trusted encryption key. Subsequently, trusted backup engine 240 may move the encrypted files to a location for more permanent storage such that the encrypted files are not affected by any encryption processes executing on endpoint system 120. As discussed above, these storage locations may include a hidden directory on file system 124, a backup store 126 structured as a portion of a hidden disk partition or an entire hidden disk partition, or network backup store 154 on a data store 150 remote from endpoint system 120.

When endpoint monitor 122 and/or a user of endpoint system 120 detects that files on endpoint system 120 have been attacked by encryption malware, trusted backup engine 240 may obtain the trusted decryption key from trusted key store 152. Using the trusted decryption key and the encrypted backup stored in file system 124 or backup store 126 on endpoint system 120 or network backup store 154 on data store 150, trusted backup engine 240 decrypts the backup to obtain the original file content. Subsequently, trusted backup engine 240 copies the original file content retrieved from the backup to the original file locations on file system 124, overwriting files that had been accessed by the encryption malware.

Figure 3:
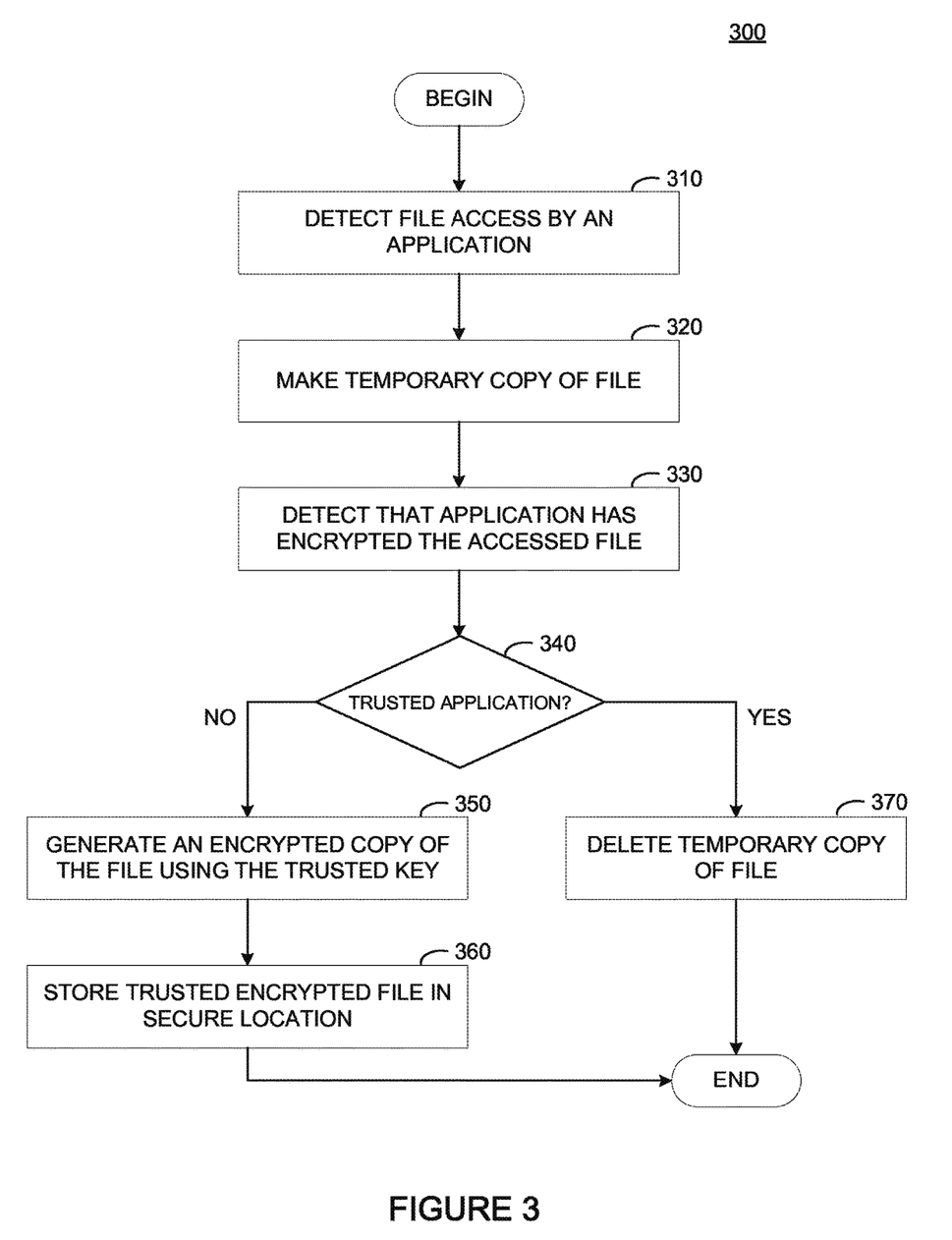
FIG. 3 illustrates example operations for detecting encryption operations by an application and creating an encrypted backup copy using a trusted key, according to one embodiment.

FIG. 3 illustrates example operations 300 that may be performed by an endpoint system to generate an encrypted backup copy of files accessed by an encryption application, according to one embodiment.

Operations 300 begin at step 310, where the endpoint system detects file access operations by an application. In response to detecting file access operations by the application, at step 320, the endpoint system makes a temporary copy of the file(s) accessed by the application. As discussed above, the temporary copy of the file(s) accessed by the application may be stored in system memory (e.g., RAM) for future use.

At step 330, the endpoint system detects that the application has encrypted the accessed file. As discussed above, the endpoint system can detect that a file has been encrypted, for example, by examining the entropy of the file and detecting that the contents of the file are significantly more random than the contents of the copy of the file stored in system memory. In some cases, the endpoint system can detect that the application has encrypted a file by detecting markers indicative of encryption by a malicious application or detecting changes to the filename that indicate that the file has been encrypted.

At step 340, the endpoint system determines whether the application is a trusted application. As discussed above, the endpoint system can obtain information about the trust status of an application by querying a reputation service, examining a local reputation repository (e.g., local whitelists and/or blacklists), or some combination of both. If the application is not a trusted application (e.g., the application has an unknown trust status or is "untrusted," or the application is not listed in a local reputation repository), at step 350, the endpoint system generates an encrypted copy of the file using the trusted encryption key. The endpoint system may retrieve the trusted encryption key, which may have been generated when endpoint monitor 122 is initially installed on an endpoint system or when a user initially registers endpoint monitor 122 with an online service, from local storage or a remote key repository. At step 360, the endpoint system stores the trusted encrypted file in a secure location. As discussed above, the secure location may generally be a location in which a malware attack would not be able to modify the contents of the trusted encrypted file. For example, the secure location may be a protected directory in local storage attached to the endpoint system, a hidden partition in local storage attached to the endpoint system, or a remote storage repository. Method 300 then ends.

If, however, the application is trusted (e.g., the application has a "good" trust status or is listed on a whitelist in a local reputation repository), the endpoint system can determine that no backup need be created for the file. At step 370, the endpoint system deletes the temporary copy of the file, and method 300 subsequently terminates.

Figure 4:
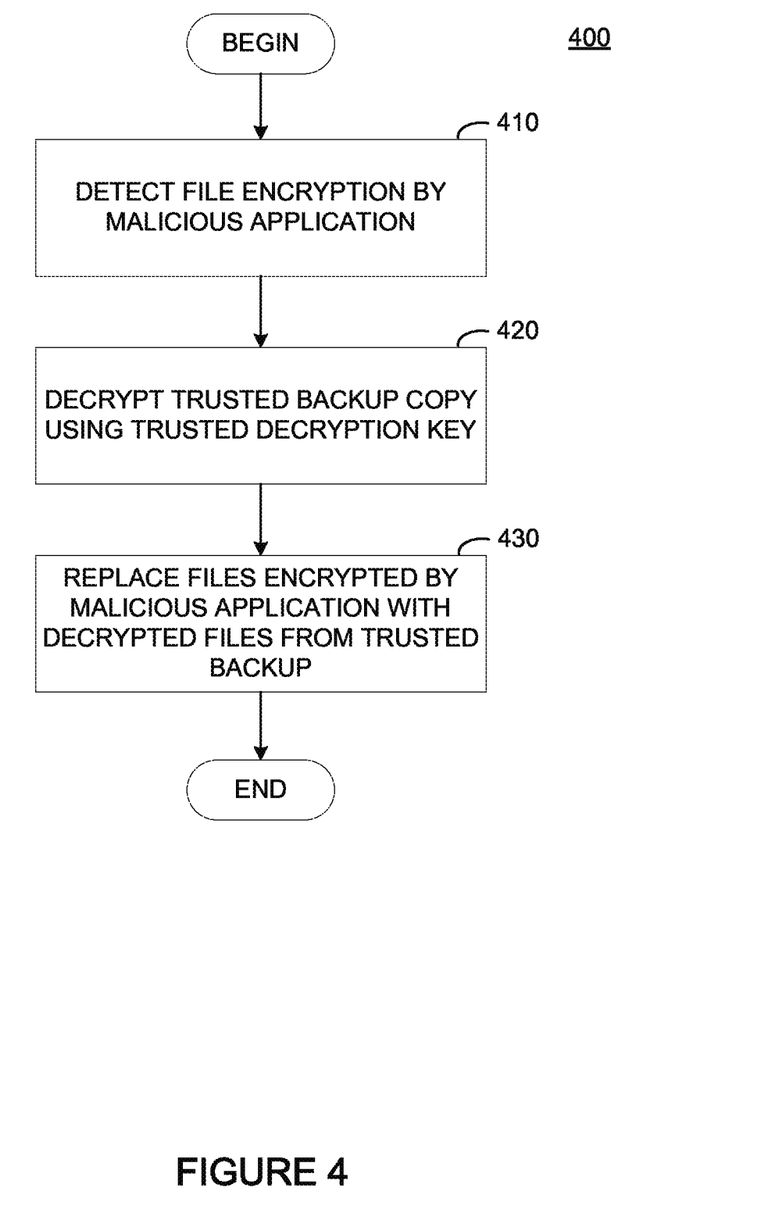
FIG. 4 illustrates example operations for restoring files from an encrypted backup copy in response to detecting encryption operations by a malicious operation, according to one embodiment.

FIG. 4 illustrates example operations 400 that may be performed by an endpoint system to restore files from a trusted backup in response to file manipulation by a malicious application (e.g., encryption ransomware), according to an embodiment.

Operations 400 begin at step 410, where the endpoint system detects file encryption by a malicious application. In some cases, as discussed above, the endpoint system can detect file encryption by a malicious application based on user feedback when the user is unable to open a large number of files. In other cases, the endpoint system can detect file encryption by a malicious application based on heuristics data or analysis as the application executes on the endpoint system.

At step 420, the endpoint system decrypts the trusted backup copy using the trusted decryption key. As discussed above, the endpoint system may obtain the trusted decryption key from a remote source and access the backup copy stored either (1) locally in a protected directory in the file system or in a hidden partition on local storage or (2) remotely from a network backup data store.

At step 430, the endpoint system replaces files encrypted by the malicious application with decrypted files obtained from the trusted backup copy. By restoring encrypted files with decrypted files from a backup copy generated in response to detecting that an application is accessing and modifying files stored on an endpoint system, data loss resulting from malicious applications may be minimized.

Figure 5:
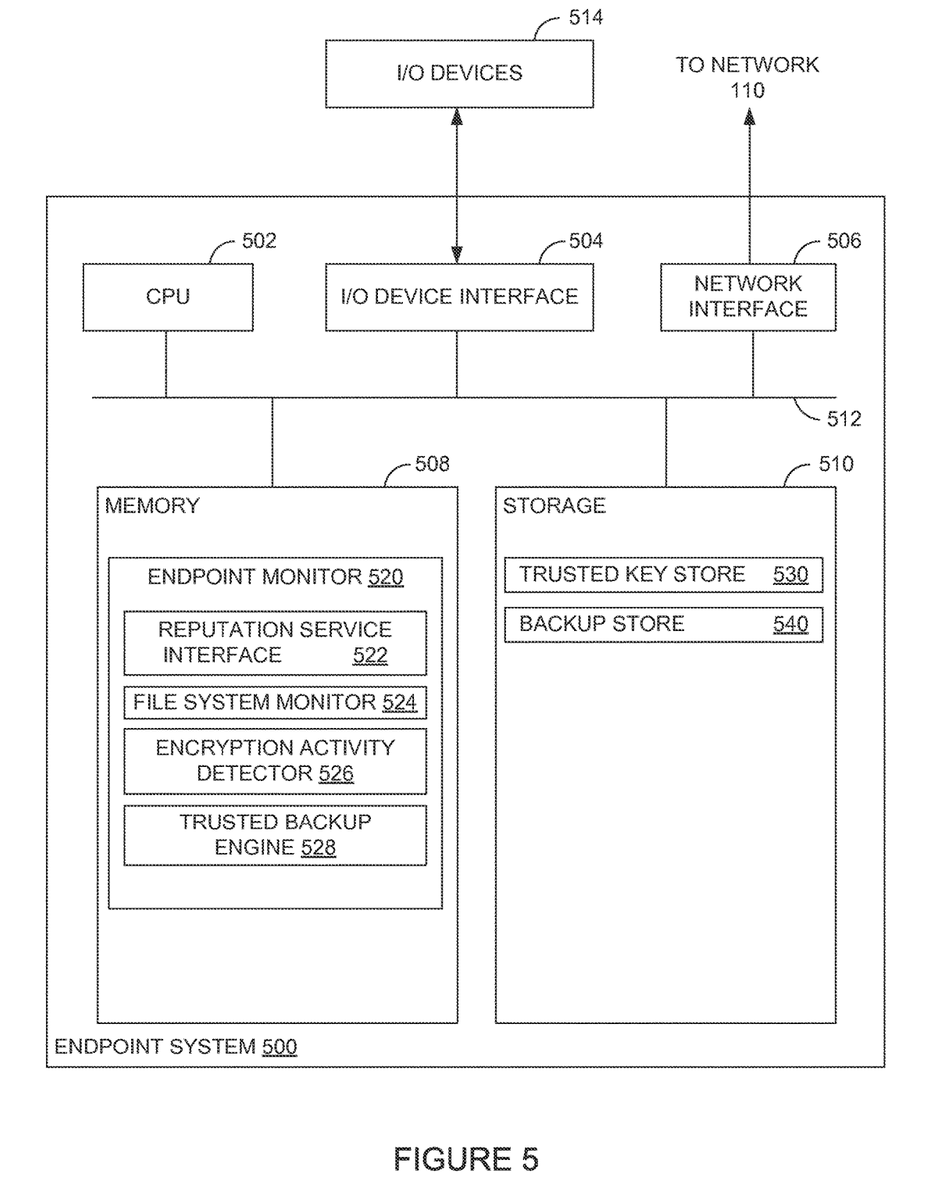
FIG. 5 illustrates an example computing system for creating encrypted backup copies of files in response to detecting encryption operations on an endpoint system, according to one embodiment.

FIG. 5 illustrates an example endpoint system 500 that generates encrypted backup copies of files in response to file accesses and file encryption by an application, according to an embodiment. As shown, the endpoint system 500 includes, without limitation, a central processing unit (CPU) 502, one or more I/O device interfaces 504 which may allow for the connection of various I/O devices 514 (e.g., keyboards, displays, mouse devices, pen input, etc.) to the endpoint system 500, network interface 506, a memory 508, storage 510, and an interconnect 512.

CPU 502 may retrieve and execute programming instructions stored in the memory 505. Similarly, the CPU 502 may retrieve and store application data residing in the memory 505. The interconnect 512 transmits programming instructions and application data, among the CPU 502, I/O device interface 504, network interface 506, memory 505, and storage 510. CPU 502 is included to be representative of a single CPU, multiple CPUs, a single CPU having multiple processing cores, and the like. Additionally, the memory 505 is included to be representative of a random access memory. Furthermore, the storage 510 may be a disk drive. Although shown as a single unit, the storage 510 may be a combination of fixed and/or removable storage devices, such as fixed disc drives, removable memory cards or optical storage, network attached storage (NAS), or a storage area-network (SAN).

As shown, memory 505 includes a endpoint monitor 520, which monitors endpoint system 500 for process execution and file access operations to prevent against potential data loss events (e.g., caused by malicious applications such as encryption ransomware). Endpoint monitor 520 includes a reputation service interface 522, file system monitor 524, encryption activity detector 526, and trusted backup engine 528.

As discussed above, reputation service interface 522 monitors endpoint system 500 for the launch of new applications or processes while endpoint system is running. Reputation service interface 522 may transmit a query based on the received data to a remote reputation service via network interface 506. In response to the queries, reputation service interface 522 may receive data from the reputation service indicating if the application, library, or network destination is trusted, untrusted, or neither trusted nor untrusted. In some cases, reputation service interface 522 may be further configured to search for reputation data about an application in local whitelists or blacklists. In response to reputation data obtained from a reputation service and/or local whitelists and blacklists, reputation service interface 522 may determine whether or not to activate file system monitoring by file system monitor 524 for a given process.

File system monitor 524 is configured to monitor for file open and read operations performed by applications executing on endpoint system 500. As discussed above, in some cases, file system monitor 524 may be activated on a per-process basis, based at least in part on whether the application is trusted, untrusted, or has an unknown trust status. When an application attempts to access a file (e.g., stored locally in storage 510 or remotely on a network file store), file system monitor 524 can generate a local copy of the file and store the copy in memory 508 before granting the application access to the file.

Encryption activity detector 526 may be invoked by file system monitor 524 when a monitored application completes file read/write operations on an accessed file. As discussed above, encryption activity detector 526 can calculate the entropy of the accessed file and the copy in memory 508 and determine, based on changes in entropy between the accessed file and the copy, whether the file is likely to have been encrypted. If encryption activity detector 526 determines that the file is likely to have been encrypted, encryption activity detector 526 may invoke trusted backup engine 528 to create a backup copy of the accessed file using a trusted encryption key.

Trusted backup engine 528 can obtain a trusted encryption key associated with a user or endpoint system 500 from trusted key store 530 in storage 510 or from a remote source via network interface 506. Using the trusted encryption key, trusted backup engine encrypts the copies of accessed files stored in memory 508 and stores the encrypted backup copies in backup store 540 in storage 510 or at a remote computer accessed via network interface 506.

When endpoint monitor 520 begins file recovery procedures in response to determining that files have been encrypted by a malicious application, trusted backup engine 528 obtains the corresponding trusted decryption key associated with the user or endpoint system 500 from trusted key store 530 in storage 510 or from a remote source via network interface 506. Trusted backup engine additionally obtains encrypted backup data from backup store 540 in storage 510 or from a remote source via network interface 506 and decrypts the backup data using the trusted decryption key. Upon decryption of the backup data, trusted backup engine 528 replaces encrypted or scrambled files in storage 510 with clean copies of the files obtained from decrypting the backup data.

As shown, storage 510 includes a trusted key store 530 and a backup store 540. In some embodiments, trusted key store 530 may be a relational database including information identifying a specific user or endpoint system 500 and the associated trusted encryption and decryption keys. Backup store 540 stored on endpoint system 500, as discussed above, may be a protected directory or a hidden partition in storage 510 that is protected against encryption or modification by malicious applications. As discussed above, when encryption activity detector 526 detects that a file has been encrypted, trusted backup engine 528 creates an encrypted copy of the file using the trusted encryption key associated with the user or endpoint system 500 and stores the encrypted backup copy in backup store 540. Subsequently, the encrypted backup copy may automatically be deleted after a sufficient amount of time (e.g., an expiration time associated with the backup copy) has elapsed. If the encryption activity was the result of a malicious application, trusted backup engine can obtain backup data from backup store 540, decrypt the backup data using a trusted decryption key, and replace affected files with the decrypted files from backup store 540.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for protecting files from malicious encryption by a computer security system comprising at least one processor, the method comprising:
   detecting, by the at least one processor, an application accessing a file;
   creating, by the at least one processor, a copy of the file in temporary storage;
   determining, by the at least one processor, that the application has encrypted the file;
   in response to determining that the application has encrypted the file:
      creating, by the at least one processor, an encrypted backup copy of the file using the copy in temporary storage and a trusted key, and
      storing the encrypted backup copy in a secure storage location;
   determining that the application is a malicious application; and
   in response to determining that the application is a malicious application:
      decrypting, by the at least one processor, the encrypted backup copy of the file using the trusted key, and
      replacing the encrypted file with the decrypted backup copy.

2. The computer-implemented method of claim 1, further comprising:
   obtaining, by the at least one processor, reputation information for the application, wherein the encrypted backup copy of the file is created if the reputation information indicates that the application is unknown.

3. The computer-implemented method of claim 1, further comprising:
   obtaining, by the at least one processor, reputation information for the application, wherein the copy is created in temporary storage if the reputation information indicates that the application is unknown.

4. The computer-implemented method of claim 1, wherein determining that the application has encrypted the file comprises:
   calculating a first entropy based on the file and a second entropy based on the copy of the file in temporary storage; and
   determining that the application has encrypted the file if the first entropy exceeds the second entropy by a threshold amount.

5. The computer-implemented method of claim 1, wherein determining that the application has encrypted the file comprises:
   identifying a marker in the file determined to be characteristic of a ransomware family.

6. The computer-implemented method of claim 1, wherein determining that the application has encrypted the file comprises:
   detecting that the file was renamed to indicate that the file is encrypted.

7. The computer-implemented method of claim 1, wherein the secure storage location comprises at least one of a hidden local partition or a protected directory in local storage.

8. The computer-implemented method of claim 1, wherein the secure storage location comprises a remote backup repository.

9. The computer-implemented method of claim 1, further comprising:
   deleting, by the at least one processor, the encrypted backup copy after at least one of:
      a timer associated with the backup copy has expired;
      a storage quota associated with the secure storage location has been exceeded; or
      determining that the application is not malicious.

10. A non-transitory computer-readable storage medium storing instructions, which, when executed on a processor, perform operations for protecting files from malicious encryption, the operations comprising:
    detecting an application accessing a file;
    creating a copy of the file in temporary storage;

determining that the application has encrypted the file;
in response to determining that the application has encrypted the file:
  creating an encrypted backup copy of the file using the copy in temporary storage and a trusted key, and
  storing the encrypted backup copy in a secure storage location;
determining that the application is a malicious application; and
in response to determining that the application is a malicious application:
  decrypting, by the at least one processor, the encrypted backup copy of the file using the trusted key, and
  replacing the encrypted file with the decrypted backup copy.

11. The non-transitory computer-readable storage medium of claim 10, wherein the operations further comprise:
  obtaining reputation information for the application, wherein the encrypted backup copy of the file is created if the reputation information indicates that the application is unknown.

12. The non-transitory computer-readable storage medium of claim 10, wherein determining that the application has encrypted the file comprises at least one of:
  calculating a first entropy based on the file and a second entropy based on the copy of the file in temporary storage, and determining that the application has encrypted the file if the first entropy exceeds the second entropy by a threshold amount;
  identifying a marker in the file determined to be characteristic of a ransomware family; or
  detecting that the file was renamed to indicate that the file is encrypted.

13. The non-transitory computer-readable storage medium of claim 10, wherein the operations further comprise deleting the encrypted backup copy after at least one of:
  a timer associated with the backup copy has expired;
  a storage quota associated with the secure storage location has been exceeded; or
  determining that the application is not malicious.

14. A system comprising:
a processor; and
memory storing code, which, when executed on a processor, performs operations for protecting files from malicious encryption, the operations comprising:
  detecting an application accessing a file;
  creating a copy of the file in temporary storage;
  determining that the application has encrypted the file;
  in response to determining that the application has encrypted the file:
    creating an encrypted backup copy of the file using the copy in temporary storage and a trusted key, and
    storing the encrypted backup copy in a secure storage location;
  determining that the application is a malicious application; and
  in response to determining that the application is a malicious application:
    decrypting, by the at least one processor, the encrypted backup copy of the file using the trusted key, and
    replacing the encrypted file with the decrypted backup copy.

15. The system of claim 14, wherein the operations further comprise:
  obtaining reputation information for the application, wherein the encrypted backup copy of the file is created if the reputation information indicates that the application is unknown.

16. The system of claim 14, wherein determining that the application has encrypted the file comprises at least one of:
  calculating a first entropy based on the file and a second entropy based on the copy of the file in temporary storage, and determining that the application has encrypted the file if the first entropy exceeds the second entropy by a threshold amount;
  identifying a marker in the file determined to be characteristic of a ransomware family; or
  detecting that the file was renamed to indicate that the file is encrypted.

17. The system of claim 14, wherein the operations further comprise deleting the encrypted backup copy after at least one of:
  a timer associated with the backup copy has expired;
  a storage quota associated with the secure storage location has been exceeded; or
  determining that the application is not malicious.

* * * * *